United States Patent
Ito

(10) Patent No.: US 8,175,397 B2
(45) Date of Patent: May 8, 2012

(54) DEVICE ADAPTIVELY SWITCHING IMAGE PROCESSES IN ACCORDANCE WITH CHARACTERISTIC OF OBJECT INCLUDED IN IMAGE

(75) Inventor: Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 735 days.

(21) Appl. No.: 12/212,778

(22) Filed: Sep. 18, 2008

(65) Prior Publication Data

US 2009/0083318 A1   Mar. 26, 2009

(30) Foreign Application Priority Data

Sep. 20, 2007 (JP) ................................ 2007-244104

(51) Int. Cl.
*G06K 9/36* (2006.01)
(52) U.S. Cl. .......................... 382/232; 382/176
(58) Field of Classification Search .................. 382/173, 382/176, 185, 190, 197, 232, 282, 289; 358/1.9, 358/2.1, 462
See application file for complete search history.

(56) References Cited

U.S. PATENT DOCUMENTS

| | | | | |
|---|---|---|---|---|
| 5,054,098 A | * | 10/1991 | Lee | 382/289 |
| 5,195,147 A | * | 3/1993 | Ohta | 382/185 |
| 5,448,692 A | | 9/1995 | Ohta | |
| 5,920,648 A | * | 7/1999 | Fujimoto | 382/197 |
| 6,728,404 B1 | * | 4/2004 | Ono et al. | 382/190 |
| 7,126,612 B2 | | 10/2006 | Sekiguchi et al. | |
| 2005/0105148 A1 | | 5/2005 | Misawa | |

FOREIGN PATENT DOCUMENTS

| | | |
|---|---|---|
| JP | 05-014703 A | 1/1993 |
| JP | 5-211607 | 8/1993 |
| JP | 2005-107691 A | 4/2005 |
| JP | 2005-149096 A | 6/2005 |
| JP | 2005-174227 A | 6/2005 |

OTHER PUBLICATIONS

Office Action issued on Sep. 22, 2011, in counterpart Japanese Patent Application 2007-244104.
U.S. Appl. No. 11/231,833, filed Sep. 22, 2005.
Office Action which issued on Jan. 20, 2012, in counterpart Japanese patent No. 2007-244104.

* cited by examiner

Primary Examiner — Duy M Dang
(74) Attorney, Agent, or Firm — Fitzpatrick, Cella, Harper & Scinto

(57) ABSTRACT

The present invention relates to a device configured to determine whether to perform transform processing from image data into vector data in accordance with characteristics of an object. The device is configured: to separate an object from image data; then to determine whether to transform image data corresponding to the object into vector data; subsequently, to extract contour data of the object that has been determined to be transformed into vector data; and to perform function approximation for the extracted contour data.

7 Claims, 14 Drawing Sheets

| DOCUMENT SELECTION MODE | DETERMINATION CRITERION FOR CHARACTER OBJECT |
|---|---|
| CHARACTER | LOW |
| PHOTO | HIGH |
| CHARACTER/PHOTO | MEDIUM |

FIG.9

| CHARACTER POINT SIZE | VECTOR TRANSFORM PROCESSING |
|---|---|
| 5 | OFF |
| 10 | ON |
| 15 | ON |
| 20 | ON |
| 25 | ON |
| 30 | ON |
| 40 | OFF |
| 50 | OFF |
| 60 | OFF |
| 70 | OFF |

FIG.10

| MAGNIFICATION(%) | VECTOR TRANSFORM PROCESSING |
| --- | --- |
| 25 | ON |
| 50 | ON |
| 61 | ON |
| 70 | ON |
| 81 | OFF |
| 86 | OFF |
| 100 | OFF |
| 115 | OFF |
| 122 | OFF |
| 141 | ON |
| 200 | ON |
| 400 | ON |
| 800 | ON |

FIG.11

| THE NUMBER OF COPIES | DETERMINATION CRITERION FOR CHARACTER OBJECT |
|---|---|
| 1 COPY | HIGH |
| 2 TO 19 COPIES | MEDIUM |
| 20 COPIES OR MORE | LOW |

FIG.12

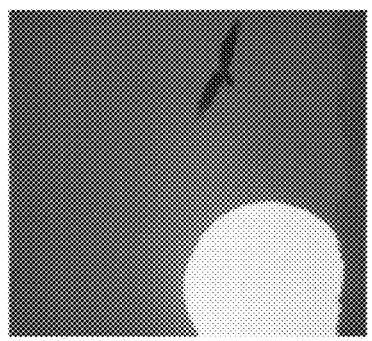
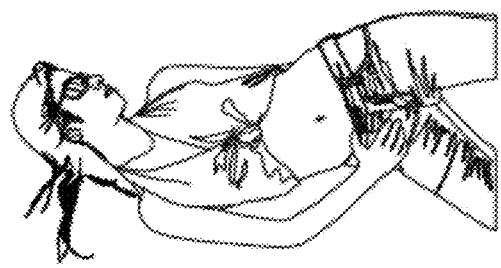
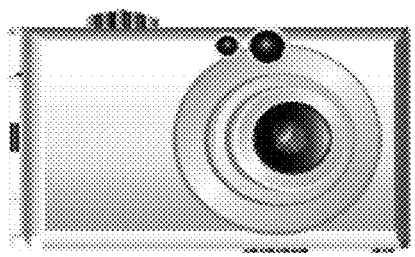
FIG.14

DEVICE ADAPTIVELY SWITCHING IMAGE PROCESSES IN ACCORDANCE WITH CHARACTERISTIC OF OBJECT INCLUDED IN IMAGE

RELATED APPLICATIONS

This application claims the benefit of Japanese Patent Application No. 2007-244104 filed Sep. 20, 2007, which is hereby incorporated by reference herein in its entirety.

BACKGROUND OF THE INVENTION

1. Field of the Invention

The present invention relates to a device which separates various objects from image data and which performs image processing on the objects thus extracted, and more specifically relates to a device which determines whether to perform the vector transform on an object in accordance with a characteristic of the object, i.e. an object attribute and/or the type of job set for the object.

2. Description of the Related Art

The spreading of digital cameras and image scanners today allows photo images to be digitalized easier than before. What has been made possible, for example, is: taking digitized photo images into a personal computer (hereafter, simply referred to as a PC); storing the images as image files; and processing and editing the image files by application programs. In addition, the image files of the photo images thus processed and edited can be laid out in an electronic document, such as a text document and a drawing. In this way, an electronic document that has photo images incorporated therein can be created.

In addition, a digital multifunctional peripheral that integrates functions of a scanner, a copier, a printer, a fax, and the like can be connected to a PC through a communication network, such as a LAN and the Internet. Such networking allows the PC to send, to the digital multifunctional peripheral, such electronic documents as a text document or a drawing incorporating a photo image taken by a digital camera. Then, the digital multifunctional peripheral can print out the received electronic document.

There exists a well-known image processing system capable of compressing image data to a higher degree while maintaining quality of an image, by separating the image data into a plurality of objects, and then by performing image processing and encoding processing on each of the objects. In addition, Japanese Patent Laid-Open No. H05-211607 discloses a method of reducing image degradation. The method includes: extracting a character object from image data; detecting a contour of the character object; and switching between smoothing the detected contour and not smoothing the detected contour. Here, whether to perform smoothing the detected contour is determined in accordance with a magnification specified by a user.

In the above-described conventional technique, after a character object is extracted from image data, transform processing from the image data into vector data (a vector image), such as a contour-extraction processing is always performed without consideration of a characteristic of the extracted character object. Note that, the contour-extraction processing, in general, takes a large amount of time. Accordingly, transforming image data into vector data without considering the characteristic of the object is likely to be a factor to lower the performance of the device.

SUMMARY OF THE INVENTION

An object of the present invention is to provide a device that determines whether to perform transform processing from image data into vector data in accordance with a characteristic of an object, i.e. an object attribute and/or the type of job set for the object.

A device according to the present invention includes a separating component, a determining component, and a vector transform component. The separating component is configured to separate an object from image data. The determining component is configured to determine whether to transform image data corresponding to the object into vector data in accordance with an attribute of the object and/or the type of job set for the object. The vector transform component is configured to extract contour data of the object that has been determined to be transformed into vector data and to perform function approximation for the extracted contour data.

A method according to the present invention includes a separating step, a determining step, and a vector transform step. The separating step includes separating an object from image data. The determining step includes determining whether to transform image data corresponding to the object into vector data in accordance with an attribute of the object and/or the type of job set for the object. The vector transform step includes extracting contour data of the object that has been determined to be transformed into vector data, and performing function approximation for the extracted contour data.

A computer-readable recording medium according to the present invention records computer-executable instructions for performing a method that includes a separating step, a determining step, and a vector transform step. The separating step includes separating an object from image data. The determining step includes determining whether to transform image data corresponding to the object into vector data in accordance with an attribute of the object and/or the type of job set for the object. The vector transform step includes extracting contour data of the object that has been determined to be transformed into vector data, and performing function approximation for the extracted contour data.

According to the present invention, upon extracting an object from image data, a determination of whether to perform the vector transform on the object is made in accordance with a characteristic of the object, i.e. an attribute of the object and/or the type of job set for the object. Therefore, the performance of the device can be improved.

Further features of the present invention will become apparent from the following description of exemplary embodiments (with reference to the attached drawings).

BRIEF DESCRIPTION OF THE DRAWINGS

FIG. 9 is a chart illustrating a relationship between a document selection mode and a determination criterion for a character object;

FIG. 10 is a table illustrating a relationship between character size and whether image data of a character is or is not transformed into vector data;

FIG. 11 is a table illustrating a relationship between a magnification and whether or not image data of an object is transformed into vector data;

FIG. 12 is a chart illustrating a relationship between the number of copies and a determination criterion for a character object;

FIG. 14 is a diagram illustrating image data after performing separation of objects.

DESCRIPTION OF THE EMBODIMENTS

Preferred embodiments of the present invention will be described with reference to the attached drawings.

A First Embodiment

Figure 1:
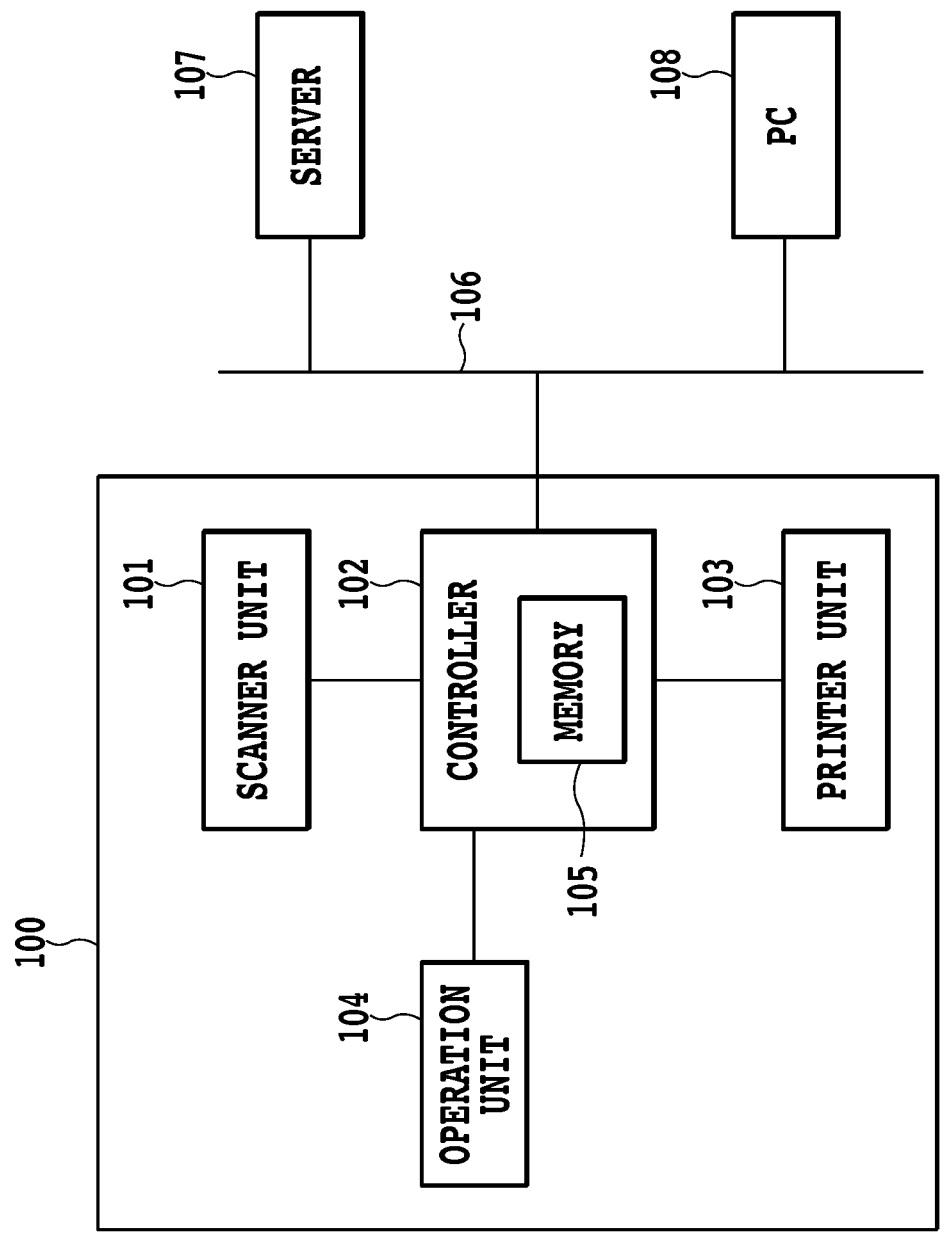
FIG. 1 is a schematic block diagram illustrating a configuration of an image processing system to which the present invention can be applied.

FIG. 1 is a block diagram illustrating an exemplary configuration of an image processing system.

The image processing system includes an image processing device 100, a server 107, and a PC 108. The image processing device 100 is mounted, for example, on a digital multifunctional peripheral that integrates functions of a scanner, a copier, a printer, a fax, and the like.

The image processing device 100 includes a scanner unit 101, a controller 102, a printer unit 103, an operation unit 104, and a memory 105. The scanner unit 101 scans image data on an original document, and outputs the image data thus scanned to the controller 102. The controller 102 performs an overall control of all the parts of the image processing device 100. In addition, the controller 102 receives image data sent from the scanner unit 101, and stores the received image data in the memory 105. The operation unit 104 provides a user interface, and receives various instructions of a user concerning a printing. For example, the operation unit 104, specified by a user, sets printing parameters for image data. The printer unit 103 forms images in accordance with the printing parameters set by the user through the operation unit 104, and prints the formed image on a paper sheet. The image processing device 100 is connected to the server 107 and the PC 108 via a network 106 such as a LAN. Here, the server 107 performs management of image data, while the PC 108 sends printing commands to the image processing device 100.

Figure 2:
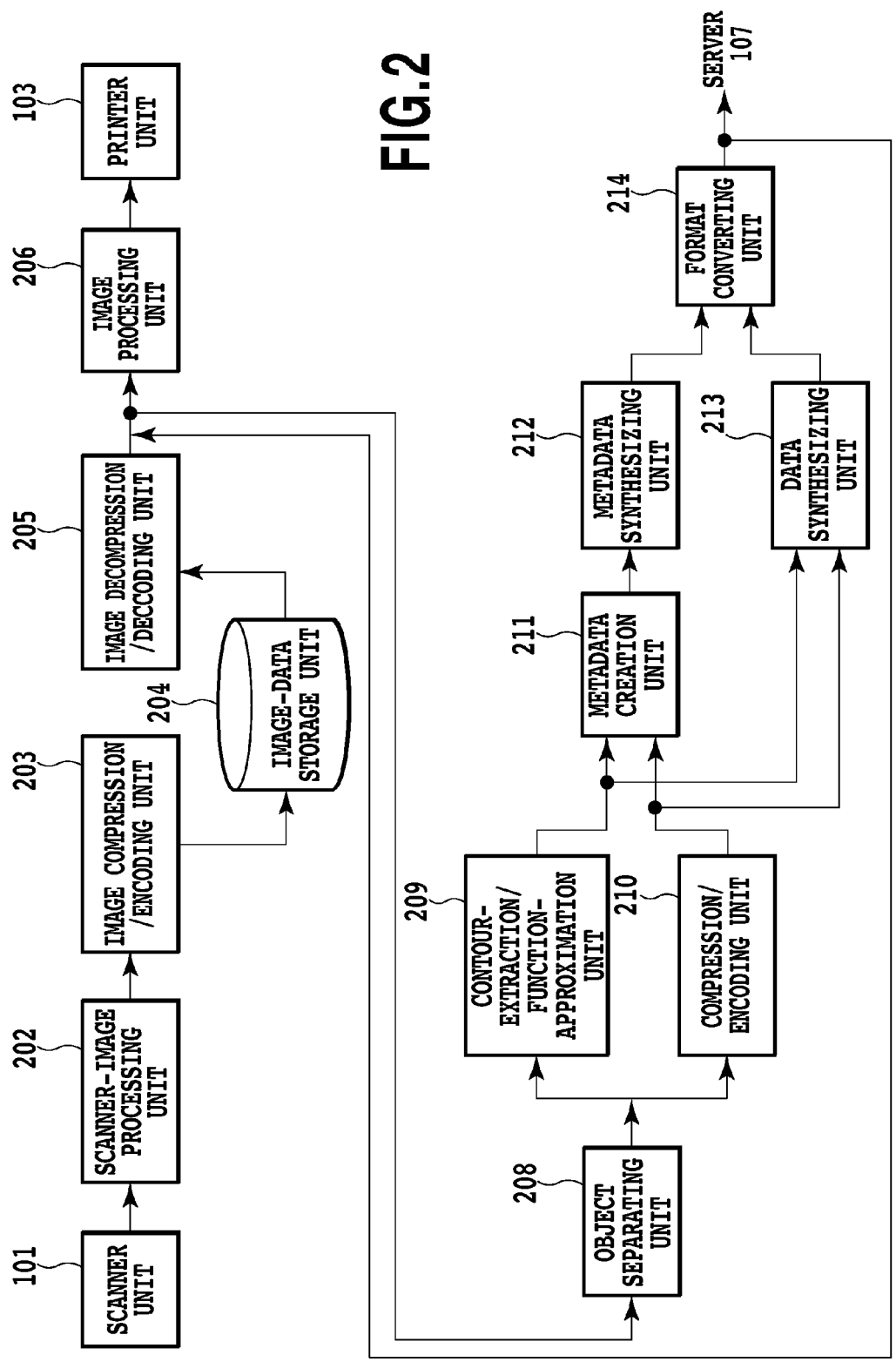
FIG. 2 is a block diagram illustrating a configuration of an image processing device of the present invention.

FIG. 2 is a block diagram illustrating various functions that the image processing device 100 includes.

A scanner-image processing unit 202 performs image processing, such as color correction processing, on the image data received from the scanner unit 101, and outputs, to an image compression/encoding unit 203, the image data that has been subjected to the image processing.

The image compression/encoding unit 203 performs compression/encoding for the image data received from the scanner-image processing unit 202. To this end, a well-known compression and decompression technique, such as JPEG, is employed.

An image-data storage unit 204 stores the image data for which the compression/encoding is performed.

An image decompression/decoding unit 205 reads the image data stored in the image-data storage unit 204, and decodes the read image data by a well-known compression and decompression technique, such as JPEG.

An image processing unit 206 performs image processing for printing out on the image data received either from the image decompression/decoding unit 205 or from a format converting unit 214, which is to be described later. The image processing unit 206 then outputs the processed image data to the printer unit 103.

When the decoded image data is printed as it is, the image decompression/decoding unit 205 outputs the decoded image data to the image processing unit 206. In contrast, when objects contained in the decoded data are separated out, the image decompression/decoding unit 205 outputs the decoded image data to an object separating unit 208.

The object separating unit 208 separates objects, such as a character object, a drawing object, a line object, a table object, and the like, included in the received image data. To this end, the object separating unit 208 determines attributes of objects (attributes such as a character, a drawing, a line, and a table) included in the image data by using a method to be described below. The determined attributes are given respectively to the objects.

Figure 13:
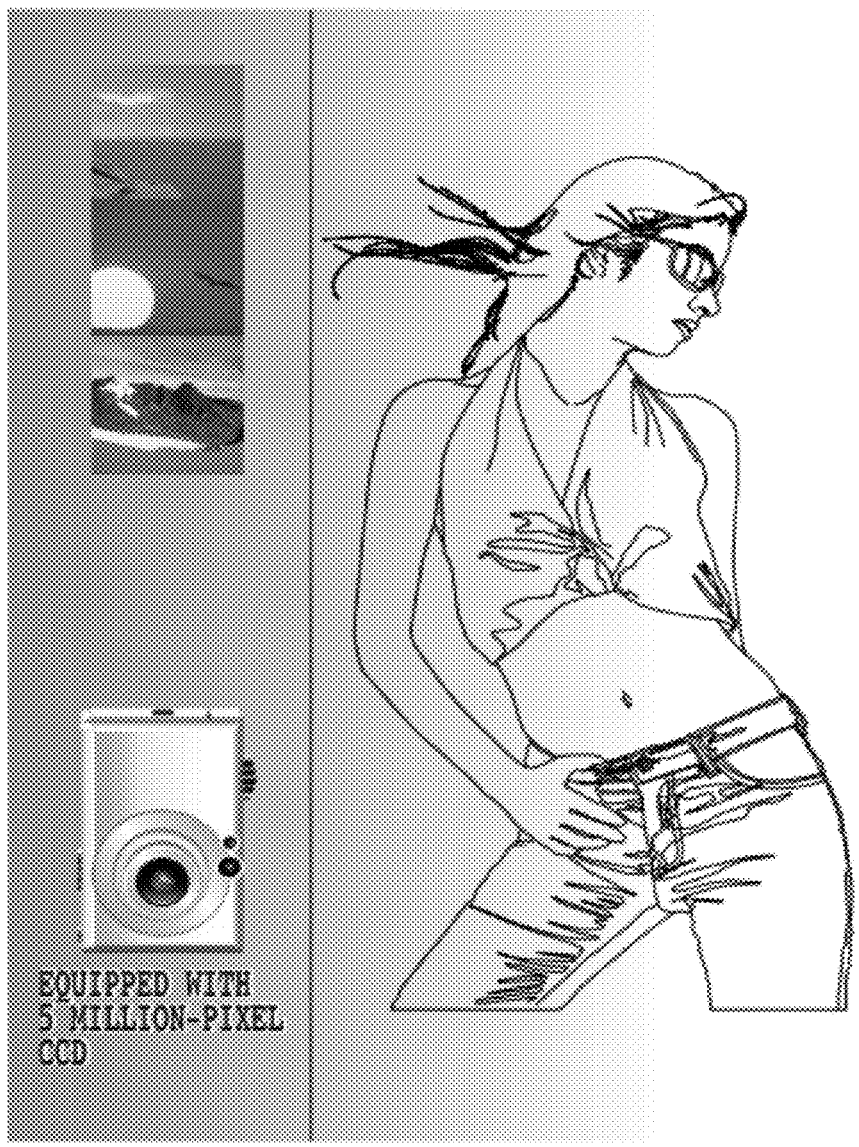
FIG. 13 is a diagram illustrating image data before performing separation of objects.

The object separating unit 208 performs binarization processing on the received image data. By tracing a contour formed by black pixels included in the binarized image data, the object separating unit 208 extracts the block surrounded by the contour. In contrast, for a block formed by black pixels and having a large area, the object separating unit 208 traces a contour formed by white pixels and located inside the block, and extracts the block surrounded by the contour. In addition, when a block surrounded by a contour formed by white pixels has a certain or larger area, the object separating unit 208 traces a contour formed by black pixels located inside the block, and extracts a block surrounded by the contour. In this way, the object separating unit 208 extracts, from the received image data, a block formed by black pixels. Then, the object separating unit 208 classifies the extracted block formed by black pixels according to its size and shape, and separates out the blocks as objects, such as a character, a drawing, a line, and a table. For example, when the aspect ratio of the extracted block is approximately 1:1, and, at the same time, the block has a size within a certain range, the block is determined to be a character-equivalent object. A portion where character-equivalent objects are arranged so as to be adjacent to one another is separated out as a character object. In addition, a block with a flat shape is separated out as a line object. Moreover, when an object includes blocks formed by white pixels and, at the same time, when each of the blocks has a certain size and the blocks are arranged to have a rectangular shape, the object is separated out as a table object. Furthermore, when blocks of indeterminate forms are scattered in an object, the object is classified to be a photo object. Still furthermore, when a block has a certain predetermined shape, the block is separated out as a drawing object. FIG. 13 illustrates image data before the separation of the objects while FIG. 14 illustrates the separated-out objects. As FIG. 14 clearly shows, the character objects, the line objects, and the photo objects included in FIG. 13 are separated out.

A contour-extraction/function-approximation unit 209 transforms the image data received from the object separating unit 208 into vector data (a vector image). Specifically, the contour-extraction/function-approximation unit 209 extracts the contour of the image data, and performs function approximation for the extracted contour with a straight line or a curve, so as to transform the image data into vector data. The vector data mentioned here is a way of expressing an image by defining a straight line or a curve with a combination of coordinate data and a mathematical formula.

A compression/encoding unit 210 performs compression/encoding for objects separated by the object separating unit 208. For example, the compression/encoding unit 210 performs compression/encoding for an object separated as a photo object by the object separating unit 208. To this end, a well-known compression and decompression technique, such as JPEG, is employed.

A metadata creation unit 211 creates metadata expressing the meanings of each data received from the contour-extraction/function-approximation unit 209 and the compression/encoding unit 210.

A metadata synthesizing unit 212 synthesizes the metadata received from the metadata creation unit 211.

A data synthesizing unit 213 synthesizes the data received from the contour-extraction/function-approximation unit 209 and the compression/encoding unit 210.

A format converting unit 214 synthesizes the outputs of the metadata synthesizing unit 212 and the data synthesizing unit 213, and converts the format of the resultant data into the format of the PDF, the XML, or the like. Then, the format converting unit 214 outputs the image data with the converted format to the image processing unit 206, or sends the image data with the converted format to the server 107 or the like via a network.

Figure 3:
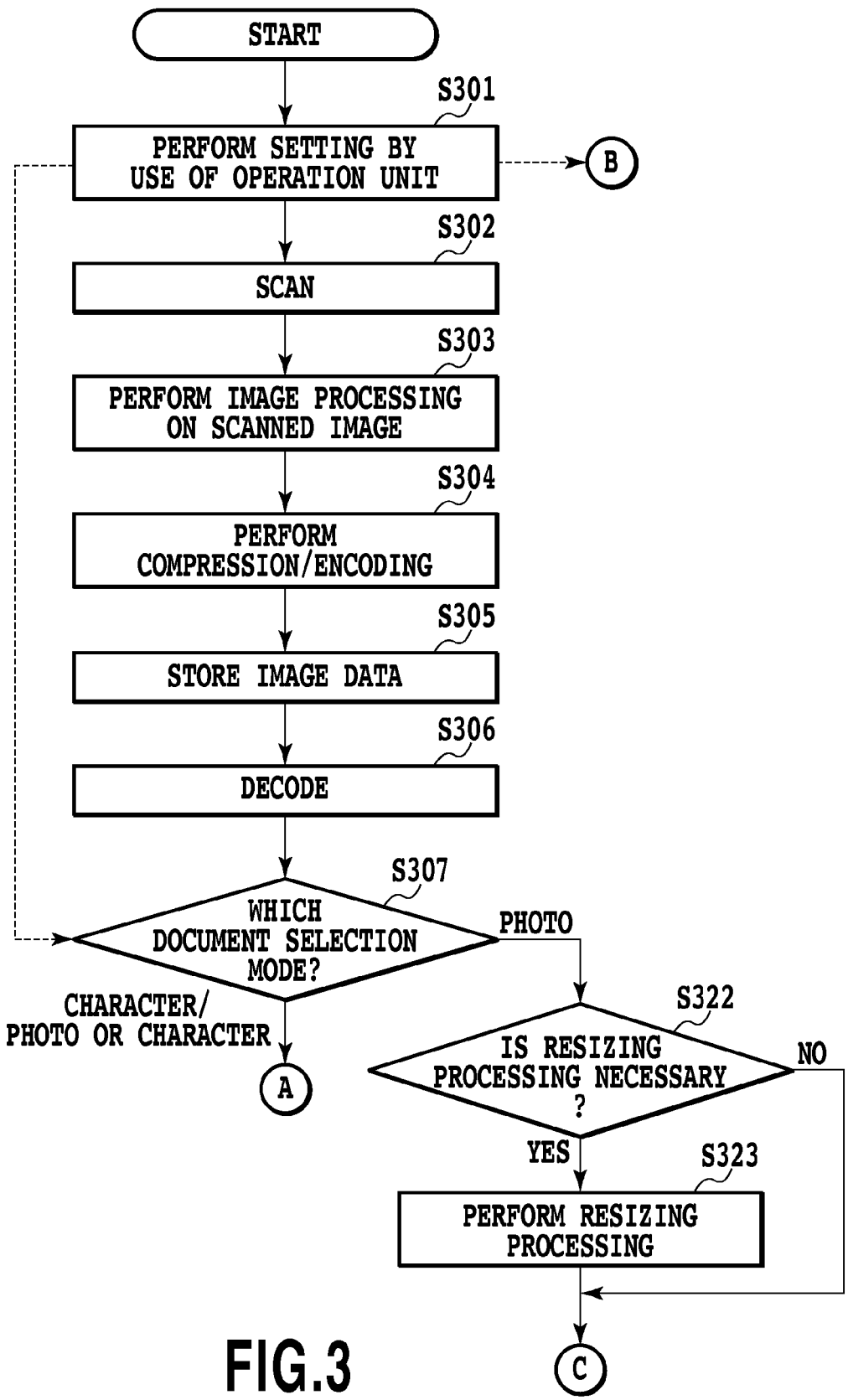
FIG. 3 is a flowchart illustrating processing according to a first embodiment of the present invention.
Figure 4:
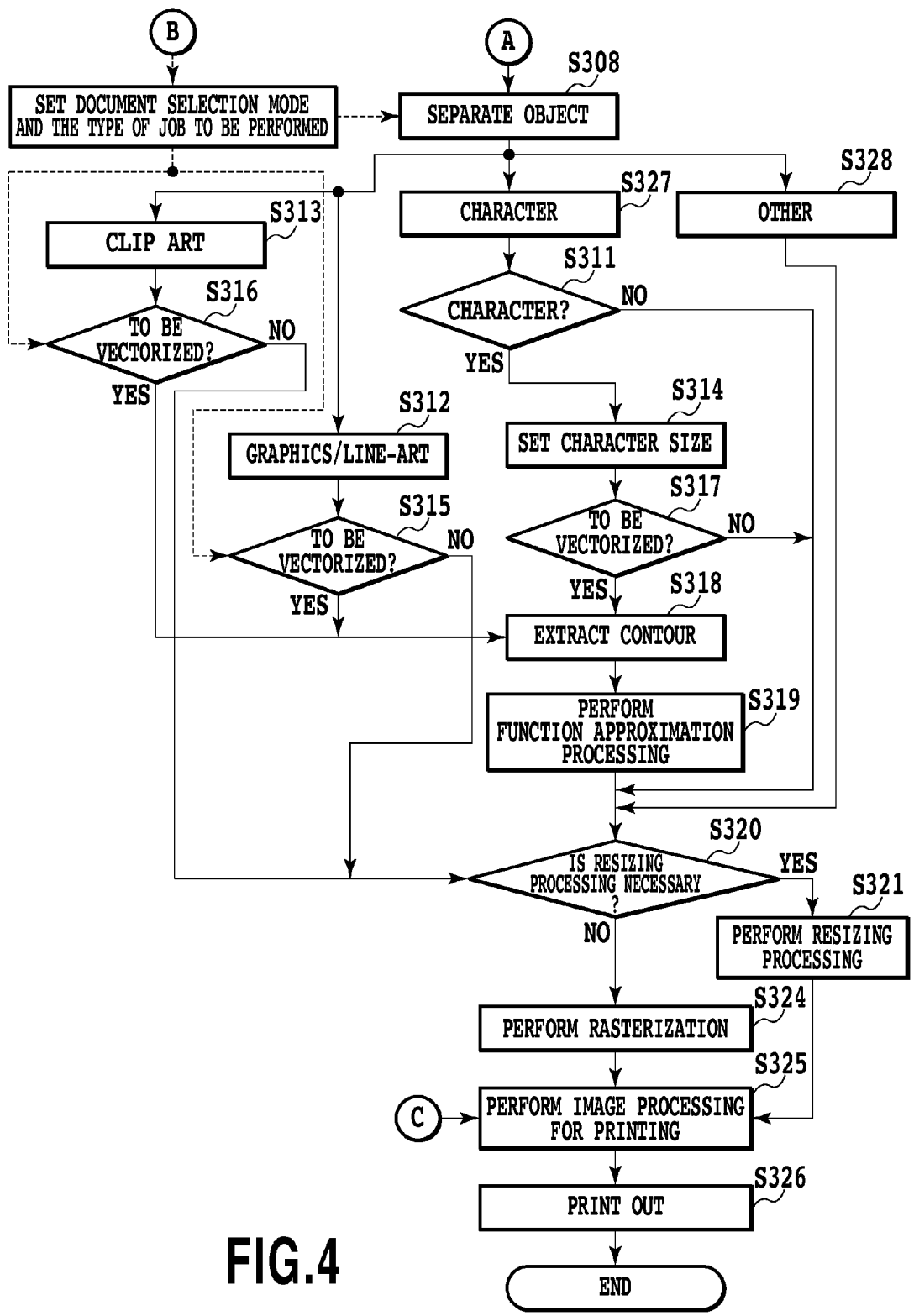
FIG. 4 is a flowchart illustrating processing according to the first embodiment of the present invention.

FIGS. 3 and 4 are flowcharts illustrating the flow of processing performed by the image processing device 100. The flow of process performed by the image processing device 100 will be described below on the basis of the configuration shown in FIG. 2.

In S301, the operation unit 104 sets the type of job to be done, the document selection mode, and the like in response to an instruction given by a user. The type of job is copying, sending, storing, or the like. The document selection mode mentioned above is the mode in which the user selects the type of original document to be read. For example, the document selection mode is a character mode, a photo mode, a character/photo mode, or the like.

In S302, when the user presses on a start button on the operation unit 104, the scanner unit 101 scans an original document, and outputs the scanned image data to the scanner-image processing unit 202.

In S303, the scanner image processing unit 202 performs image processing, such as color correction processing, on the image data received from the scanner unit 101, and outputs the resultant data to the image compression/encoding unit 203.

In S304, the image compression/encoding unit 203 performs compression/encoding for the image data received from the scanner image processing unit 202, and outputs the resultant data to the image-data storage unit 204. The compression/encoding is performed by a well-known compression and decompression technique, such as JPEG.

In S305, the image-data storage unit 204 stores the compressed image data received from the image compression/encoding unit 203. For example, the image-data storage unit 204 may be a storage device provided outside of the image processing device 100, or a hard-disk drive built in the image processing device 100.

In S306, the image decompression/decoding unit 205 reads out the compressed image data from the image-data storage unit 204, and decodes the data thus read out. The decoding of the compressed image data is performed by a well-known compression and decompression technique, such as JPEG.

In S307, the controller 102 switches the processing performed on the decoded image data from one to another in accordance with the document selection mode having been set in S301. Specifically, when the document selection mode is set at the photo mode, the process proceeds to S322. When the document selection mode is set either at the character/photo mode or at the character mode, the process proceeds to S308.

When the document selection mode is set at the photo mode, the image processing device 100 performs the following processing.

In S322, when the type of job to be done is copying, the controller 102 determines whether or not resizing processing is necessary. When resizing processing is necessary, the resizing processing is performed in S323, and the resized image data is outputted to the image processing unit 206. To perform the resizing processing, a well-known technique can be employed.

In S325, the image processing unit 206 performs image processing for printing on the received image data, and outputs the resultant data to the printer unit 103. The image processing for printing mentioned here includes, for example, a well-known color correction processing and the like.

In S326, the printer unit 103 receives and prints out the image data that has been subjected to the image processing for printing.

When the document selection mode is set either at the character/photo mode or at the character mode, the image processing device 100 performs the following processing.

In S308, the object separating unit 208 separates objects such as a character object, a drawing object, a line object, a table object, and the like from the image data received from the image decompression/decoding unit 205. When the separation of objects is performed, the object separating unit 208 modifies a criterion for determining the type of the object in accordance with the document selection mode which has been set with the operation unit 104. For example, when the document selection mode is set at the character mode, the object separating unit 208 establishes a criterion that makes the object more likely to be determined as the character object. To put it differently, the object separating unit 208 establishes a lower criterion for determining the object as the character object. On the other hand, when the document selection mode is set at the character/photo mode, the object separating unit 208 establishes a higher criterion for determining the object as the character object. In this way, nothing but character can be determined as the character object with more certainty. Also in the determination of clip-art object or graphic/line-art object, the determination criterion is modified in accordance with the document selection mode.

In this way, the received image data is separated into the character object, the graphic/line-art object and the clip-art object. When an object is determined as the character object, the process proceeds to S327. When an object is determined as the graphic/line-art object, the process proceeds to S312. When an object is determined as the clip-art object, the process proceeds to S313. Also, when it is determined that an object does not correspond to any one of these objects, the process proceeds to S328 and the object is processed as otherwise object.

FIG. 9 is a chart illustrating a relationship between the document selection mode and the determination criterion for the character object. Note that the relationship shown in FIG. 9 is nothing but an example. The relationship between the document selection mode and the determination criterion for the character object can be set arbitrarily.

FIG. 9 shows that a lower determination criterion for the character object is applied to the case where the document selection mode is set at the character mode. Accordingly, in this case, an object is more likely to be determined as the character object than otherwise. In contrast, a higher determination criterion for the character object is applied to the case where the document selection mode is set at the photo mode. Accordingly, in this case, an object is less likely to be determined as the character object than otherwise.

If the vector transform for the graphic object is, for example, performed for an object which should be determined as the character object, it is possible that image degradation occurs. In addition, the vector transform for objects except for the character object requires more processing time than the vector transform for the character object. Accordingly, a method of setting the determination criterion for determining whether a object is the character object or otherwise object is relevant to whether or not a user hopes that as many objects as possible in an image are determined as the character objects. If the user hopes that as many as objects as possible in an image are determined as the character objects, the determination criterion for the character object will be lowered.

As described above, the reason why the document selection mode is set at the character mode by the user is because the user has determined that many characters exist in a document. In this case, the user increases the number of objects which are determined as the character objects by lowering the determination criterion for the character object.

When an object is determined as the character object in S308, the process proceeds to S327. Subsequently, the object separating unit 208 further performs a determination whether or not the object that has been determined as the character object is actually a character. When the object actually corresponds to a character, the process proceeds to S314. In contrast, when the object does not correspond to a character, the process proceeds to S320.

In S314, the controller 102 set the size of the character which is to be transformed into vector data.

Whether or not the character object is transformed into vector data is determined on the basis of the character size, using a table shown in FIG. 10. FIG. 10 shows an example of table illustrating a relationship between the character size and whether or not the image data of the character is transformed into vector data (ON/OFF of the vector transform processing).

An advantage of performing the vector transform is that smooth image can be obtained by enlarging a character using vector data, comparing with enlarging a character using bitmap data. Accordingly, the vector transform is performed for an object comprising of certain points, which has a possibility of be enlarged after performing the vector transform. Specifically, when the character size, which corresponds to the number of points, is in a range from 10 to 30 points, the vector transform is performed for the image data of the character. On the other hand, when the number of points is equal to 5, typically, image quality has already been low by scanning an image. In this case, the vector transform is not performed because the advantage cannot be obtained even if the vector transform is performed. Also, when the number of points is in a range from 40 to 70, enlarging the character is not supposed to be performed after performing the vector transform. Accordingly, the vector transform is not performed because the advantage cannot be obtained even if the vector transform is performed. Parameters illustrated in FIG. 10 are registered for the above-mentioned reasons. These parameters are previously settable by an administrator. Also, a threshold of character size is arbitrarily settable.

In S317, the controller 102 determines, by referring to the above-mentioned table, whether to transform the image data of the character into vector data. When the controller 102 determines that the image data of the character is transformed into vector data, the process proceeds to S318. In contrast, when the controller 102 determines that the image data of the character is not transformed into vector data, the process proceeds to S320.

In S318, the contour-extraction/function-approximation unit 209 extracts the contour data of the character.

In S319, the contour-extraction/function-approximation unit 209 performs function approximation for the contour data of the extracted character with a straight line or a curve. The processing of function approximation can be performed by a well-known technique.

In S320, the controller 102 determines whether or not the contour data of the character for which function approximation has been performed is necessary to be resized. When the controller 102 determines that the contour data is necessary to be resized, the process proceeds to S321. In contrast, when the controller 102 determines that the contour data is not necessary to be resized, the process proceeds to S324.

In S321, the controller 102 resizes the contour data of the character for which function approximation has been performed.

In S324, the controller 102 transforms the contour data of the character for which function approximation has been performed into bitmap data (that is, the contour data is rasterized).

The rasterized contour data of the character is subjected to predetermined processing in each of the metadata creation unit 211, the metadata synthesizing unit 212, the data synthesizing unit 213, and the format converting unit 214. After that, the resultant data is outputted, as image data, to a printer-image processing unit 325.

In S325, the printer-image processing unit 325 performs image processing for printing on the received image data.

In S326, the printer unit 103 receives the image data on which the image processing for printing has been performed, and prints out the received data.

In S312, the controller 102 determines what type of image the object that has been determined as a graphics/line-art is. In the first embodiment, the controller 102 determines whether the object has a chromatic color or an achromatic color. After that, the process proceeds to S315.

In S315, the controller 102 determines whether to transform the image data of the graphics/line-art into vector data. The determination is made based both on the determination result in S312 (whether the object has the chromatic color or the achromatic color) and on the type of job set with the operation unit 104 in S301. For example, when the type of job is copying and the object has the chromatic color, the controller 102 determines that the image data is not transformed into vector data. Alternatively, when the type of job is copying and the object has the achromatic color, the controller 102 determines that the image data is transformed into vector data. Still alternatively, when the type of job is sending, the controller 102 determines that the image data is transformed into vector data irrespective of whether the object has the chromatic color or the achromatic color.

The reason why the determination criterion is established will be described below.

After performing the vector transform, there exists a possibility that similarity between an original image data and the vector transformed image data lowers. On the other hand, a user usually emphasizes the similarity between the original image data and the vector transformed image data when the type of job is copying. Also, a user generally emphasizes the similarity between the original image data and the vector transformed image data when an object in an image has the chromatic color. Accordingly, it is determined that the vector transform is not performed when the type of job is copying and an object in an image has the chromatic color. On the other hand, the user does not always emphasize the similarity between the original image data and the vector transformed image data when an object in an image has the achromatic color, comparing with the case in which an object in an image has the chromatic color. Accordingly, it is determined that the vector transform is performed when an object in an image has the achromatic color, even if the type of job is copying or sending. When the type of job is sending, a user does not always emphasize the similarity between the original image data and the vector transformed image data. Accordingly, it is determined that the vector transform is performed when the type of job is sending, even if an object has the chromatic color.

In S313, the controller 102 determines what type of image the object that has been determined as a clip art is. In the first embodiment, the controller 102 determines the number of colors that the object has. After that, the process proceeds to S316.

In S316, the controller 102 determines whether to transform the image data of the clip art into vector data. The determination is made based both on the determination result in S313 (the number of colors) and on the type of job set with the operation unit 104 in S301. For example, when the type of job is copying and the number of colors is 64, the controller 102 determines that the image data is not transformed into vector data. Alternatively, when the type of job is sending and the number of colors is 64, the controller 102 determines that the image data is transformed into vector data. The number of colors indicates the number of colors which actually emerge when RGB histogram of image data is calculated. When the number of colors is large, a user generally emphasizes the similarity between the original image data and the vector transformed image data. Accordingly, it is determined that the vector transform for image data is not performed when the type of job is copying and the number of colors of image data is large. On the other hand, a user does not always emphasize the similarity between the original image data and the vector transformed image data when the type of job is sending, comparing with the case in which the type of job is copying. Accordingly, it is determined that the vector transform for image data is performed when the type of job is sending, even if the number of colors of image data is large. Also, in the above description, the threshold of the number of colors is 64, however, the threshold may be arbitrarily settable.

The controller 102 performs the processing described at each of S318 to S326 on the object that has been determined that the image data thereof is transformed into vector data either in S315 or S316. In contrast, the controller 102 performs the processing described at each of S320 to 326 on the object that has been determined that the image data thereof is not transformed into vector data.

In addition, the controller 102 performs the processing described at each of S320 to S326 on the object that has been determined that the image data thereof is not transformed into vector data in S317. According to the first embodiment, after separating objects from image data, whether or not the object is transformed into vector data can be determined in accordance with the size of the object and the type of job ser for the object, which is a characteristic of the separated object. This will enable to improve performance of the device because the vector transform is only performed for an object which is worthwhile for performing the vector transform.

A Second Embodiment

The configurations of an image processing system and an image processing device of a second embodiment are respectively the same as those of the first embodiment.

Figure 5:
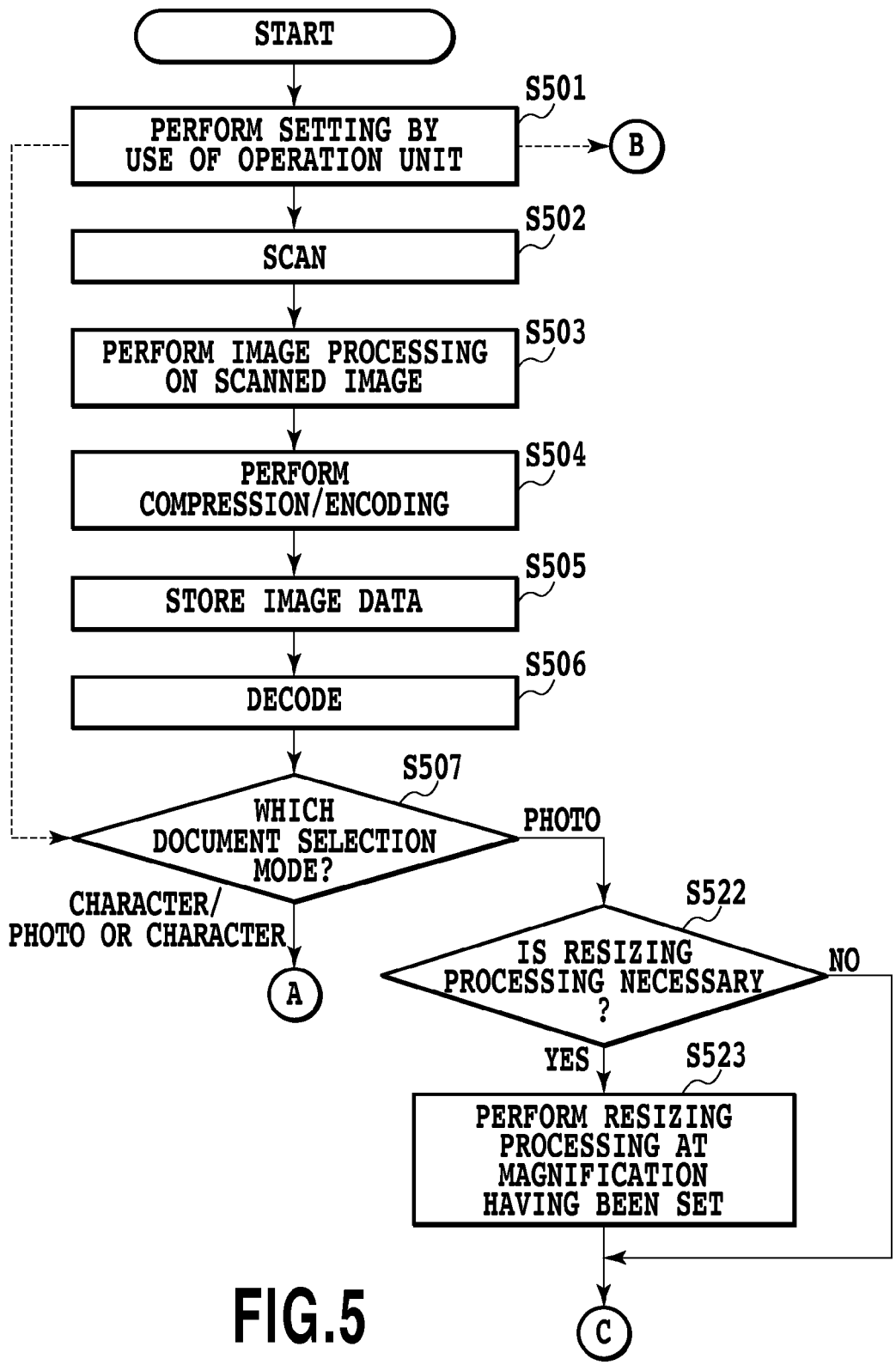
FIG. 5 is a flowchart illustrating processing according to a second embodiment of the present invention.
Figure 6:
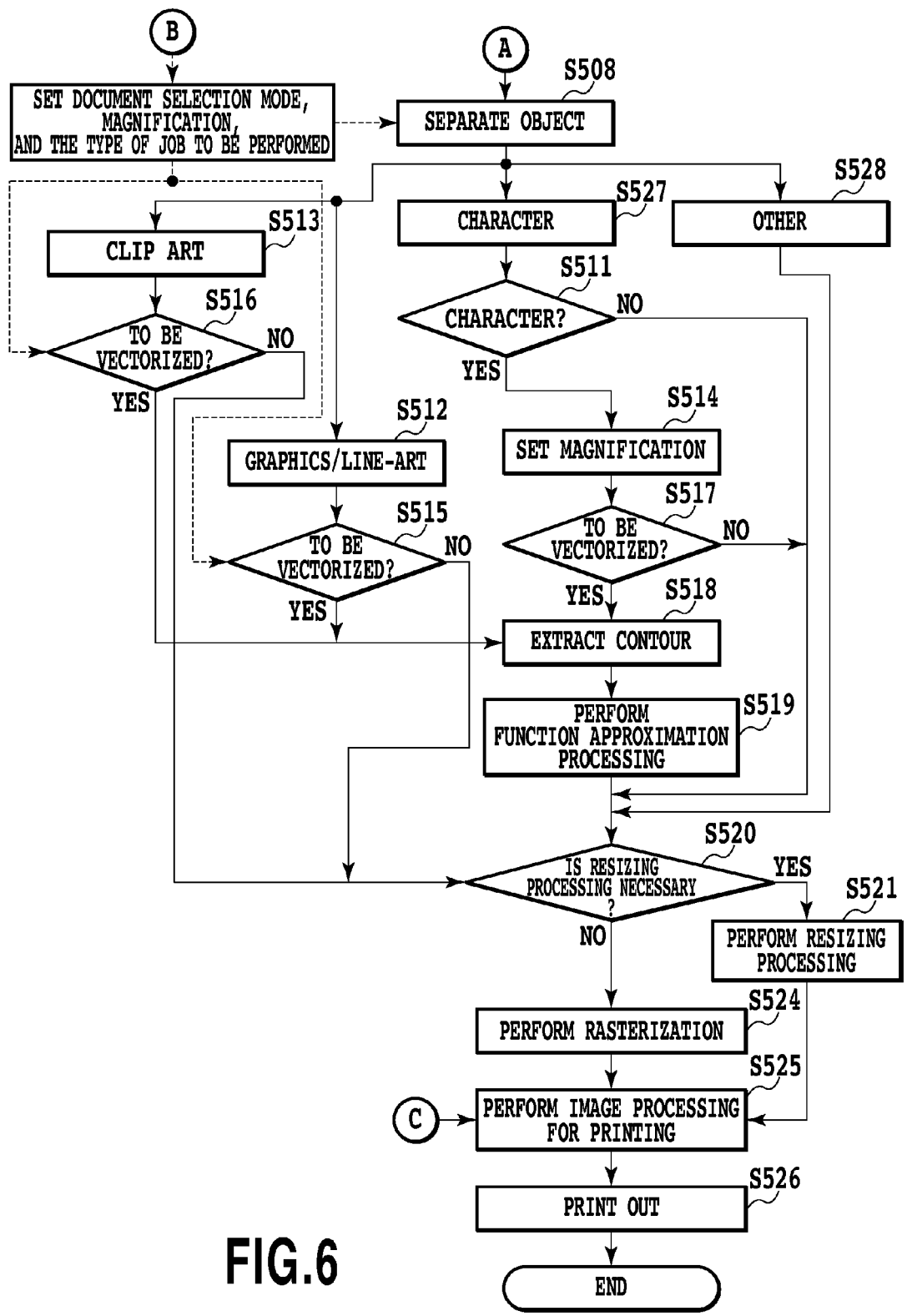
FIG. 6 is a flowchart illustrating processing according to the second embodiment of the present invention.

FIGS. 5 and 6 are flowcharts illustrating the flow of processing performed by the image processing device 100. The flow of processing performed by the image processing device 100 will be described below with reference to the configuration shown in FIG. 2.

In S501, the operation unit 104 sets the type of job to be done, the document selection mode, the magnification, and the like, according to instructions given by a user. The type of jobs is copying, sending, storing, or the like. The document selection mode mentioned above is the mode in which the user selects the type of original document to be read. For example, the document selection mode is a character mode, a photo mode, a character/photo mode, or the like.

In S502, when the user presses on the start button on the operation unit 104, the scanner unit 101 scans the original document, and outputs the scanned image data to the scanner-image processing unit 202.

In S503, the scanner image processing unit 202 performs image processing, such as color correction processing, on the image data received from the scanner unit 101, and outputs the resultant data to the image compression/encoding unit 203.

In S504, the image compression/encoding unit 203 performs compression/encoding for the image data received from the scanner image processing unit 202, and outputs the resultant data to the image-data storage unit 204. The compression/encoding is performed by a well-known compression and decompression technique, such as JPEG.

In S505, the image-data storage unit 204 stores the compressed image data received from the image compression/encoding unit 203. For example, the image-data storage unit 204 may be a storage device provided outside of the image processing device 100, or a hard-disk drive built in the image processing device 100.

In S506, the image decompression/decoding unit 205 reads out the compressed image data from the image-data storage unit 204, and decodes the data thus read out. The decoding of the compressed image data is performed by a well-known compression and decompression technique, such as JPEG.

In S507, the controller 102 switches the processing performed on the decoded image data from one to another in accordance with the document selection mode having been set in S501. Specifically, when the document selection mode is set at the photo mode, the process proceeds to S522. When the document selection mode is set either at the character/photo mode or at the character mode, the process proceeds to S508.

When the document selection mode is set at the photo mode, the image processing device 100 performs the following processing.

In S522, when the type of job to be done is copying, the controller 102 determines whether to perform resizing processing, according to the magnification set in S501. When the controller 102 determines that resizing processing is performed, the controller 102 performs the resizing processing in S523, and the resized image data is outputted to the image processing unit 206. For example, the controller 102 is configured to determine that the resizing processing is performed when the magnification is set at 140%. The resizing can be performed by a well-known technique.

In S525, the image processing unit 206 performs image processing for printing on the received image data, and outputs the resultant data to the printer unit 103. The image processing for printing mentioned here includes, for example, a well-known color correction processing and the like.

In S526, the printer unit 103 receives and prints out the image data that has been subjected to the image processing for printing.

When the document selection mode is set either at the character/photo mode or at the character mode, the image processing device 100 performs the following processing.

In S508, the object separating unit 208 separates objects such as a character object, a drawing object, a line object, a table object, and the like from the image data received from the image decompression/decoding unit 205. When the separation of objects is performed, the object separating unit 208 modifies a criterion for determining the type of the object in accordance with the document selection mode and the magnification which have been set with the operation unit 104. For example, when the document selection mode is set at the character mode and the magnification is set at 200%, the object separating unit 208 establishes a criterion which makes the object more likely to be determined as the character object. This will increase the number of objects which are determined as the character objects, comparing with the case in which the document selection mode is set at the character mode and the magnification is set at 100%.

As described above, if the vector transform for the graphic object is, for example, performed for an object which should be determined as the character object, the image degradation is possible to occur. In addition, the vector transform for objects except for the character object requires more processing time than the vector transform for the character object. Accordingly, a method of setting the determination criterion for determining whether a object is the character object or otherwise object is relevant to whether or not a user hopes that as many objects as possible in an image are determined as the character objects. If the user hopes that as many as objects as possible in an image are determined as the character objects, the determination criterion for the character object will be lowered. For example, as described above, when a user has set a large magnification for the character object, the user hopes that image quality of a character after resizing is high. Accordingly, when the document selection mode is set at the character mode and the magnification is high, the determination criterion is established so that an object is easily determined as the character object and the vector transform is suitably performed. Accordingly, when the document selection mode is set at the photo mode and the magnification is set at 200%, the object separating unit 208 establishes a higher determination criterion for determining the object as the character object. In this way, nothing but characters can be determined as the character objects with more certainty. Also in the determination of the clip-art objects or the graphic/line-art objects, the determination criterion is modified in accordance with the setting of the document selection mode and the magnification. Also, when the document selection mode is set at the character mode and the magnification is set in a range from 25% to 70%, the determination criterion for easily determining an object as the character object is established.

In this way, the received image data is separated into the character object, the graphic/line-art object and the clip-art object.

When an object is determined as the character object, the process proceeds to S527. When an object is determined as the graphic/line-art object, the process proceeds to S512. When an object is determined as the clip-art object, the process proceeds to S513. Also, when it is determined that an object does not correspond to any one of these objects, the process proceeds to S528 and the object is processed as otherwise object.

When an object is determined as the character object in S508, the process proceeds to S527. Subsequently, in S511, the object separating unit 208 further performs a determination whether or not the object that has been determined as the character object actually corresponds to a character. When the object actually corresponds to a character, the process proceeds to S514. In contrast, when the object does not correspond to a character, the process proceeds to S521.

In S514, the controller 102 set the magnification.

FIG. 11 is a table illustrating a relationship between the magnification and whether or not the image data of the character is transformed into vector data (ON/OFF of the vector processing). The parameters registered in the table are: when the magnification (%) is in a range from 25% to 70% or in a range from 141% to 800%, the image data for the character is transformed into vector data.

As described above, the image quality becomes high when resizing using the vector transformed data, comparing with resizing using bitmap data. Accordingly, when the magnification is in a range from 27% to 70% or 141% to 800%, performing the vector transform is worthwhile. Accordingly, such determination criterion is established. Also, when the magnification is in a range from 81% to 122%, the parameters that the image data for the character is not transformed into vector data are registered. When an image is slightly enlarged or reduced, whether using bitmap data or using vector data does not affect the image quality. Accordingly, when the magnification is in a range from 81% to 122%, performing the vector transform is not always worthwhile. Accordingly, such determination criterion is established. These parameters are previously settable by an administrator. Also, a threshold of character size is arbitrarily settable.

In S517, the controller 102 determines, by referring to the above-mentioned table, whether to transform the image data of the character into vector data. When the controller 102 determines that the image data of the character is transformed into vector data, the process proceeds to S518. In contrast, when the controller 102 determines that the image data of the character is not transformed into vector data, the process proceeds to S520.

In S518, the contour-extraction/function-approximation unit 209 extracts the contour data of the character.

In S519, the contour-extraction/function-approximation unit 209 performs function approximation for the contour data of the extracted character with a straight line or a curve. The processing of function approximation can be performed by a well-known technique.

In S520, the controller 102 determines whether or not the contour data of the character for which function approximation has been performed is necessary to be resized. When the controller 102 determines that the contour data is necessary to be resized, the process proceeds to S521. In contrast, when the controller 102 determines that the contour data is not necessary be resized, the process proceeds to S524.

In S521, the controller 102 resizes the contour data of the character for which function approximation has been performed.

In S524, the controller 102 transforms the contour data of the character for which function approximation has been performed into bitmap data (that is, the contour data is rasterized).

The rasterized contour data of the character is subjected to predetermined processing in each of the metadata creation unit 211, the metadata synthesizing unit 212, the data synthesizing unit 213, and the format converting unit 214. After that, the resultant data is outputted, as image data, to a printer-image processing unit 325.

In S525, the printer-image processing unit 325 performs image processing for printing on the received image data.

In S526, the printer unit 103 receives the image data on which the image processing for printing has been performed, and prints out the received data.

In S512, the controller 102 determines what type of image the object that has been determined as a graphics/line-art is. In the second embodiment, the controller 102 determines whether the object has the chromatic color or the achromatic color. After that, the process proceeds to S515.

In S515, the controller 102 determines whether to transform the image data of the graphics/line-art into vector data. The determination is made based both on the determination result in S512 (whether the object has the chromatic color or the achromatic color) and on the type of job set with the operation unit 104. For example, when the type of job is copying and the object has the chromatic color, the controller 102 determines that the image data is not transformed into vector data. Alternatively, when the type of job is copying and the object has the achromatic color, the controller 102 determines that the image data is transformed into vector data. Still alternatively, when the type of job is sending, the controller 102 determines that the image data is transformed into vector data irrespective of whether the object has the chromatic color or the achromatic color.

In S513, the controller 102 determines what type of image the object that has been determined as a clip art is. In the second embodiment, the controller 102 determines the number of colors that the object has. After that, the process proceeds to S516.

In S516, the controller 102 determines whether to transform the image data of the clip art into vector data. The determination is made based both on the determination result in S513 (the number of colors) and on the type of job set with the operation unit 104. For example, when the type of job is copying and the number of colors is 64, the controller 102 determines that the image data is not transformed into vector data. Alternatively, when the type of job is sending and the number of colors is 64, the controller 102 determines that the image data is transformed into vector data.

Then, the controller 102 performs the processing described at each of S518 to 526 on the object that has been determined that the image data thereof is transformed into vector data either in S515 or S516. In contrast, the controller 102 performs the processing described at each of S520 to 526 on the object that has been determined that the image data thereof is transformed into vector data.

The controller 102 performs the processing described at each of S520 to S526 on the object that has been determined that the image data thereof is not transformed into vector data in S517.

According to the second embodiment, it becomes possible to determine whether or not the vector transform is performed, after considering advantage of vector data for resizing, following separating the image data into the objects. This will enable to improve performance of the device because the vector transform is only performed for an object which is worthwhile for performing the vector transform.

A Third Embodiment

The configurations of an image processing system and an image processing device of a third embodiment are respectively the same as those of the first embodiment.

Figure 7:
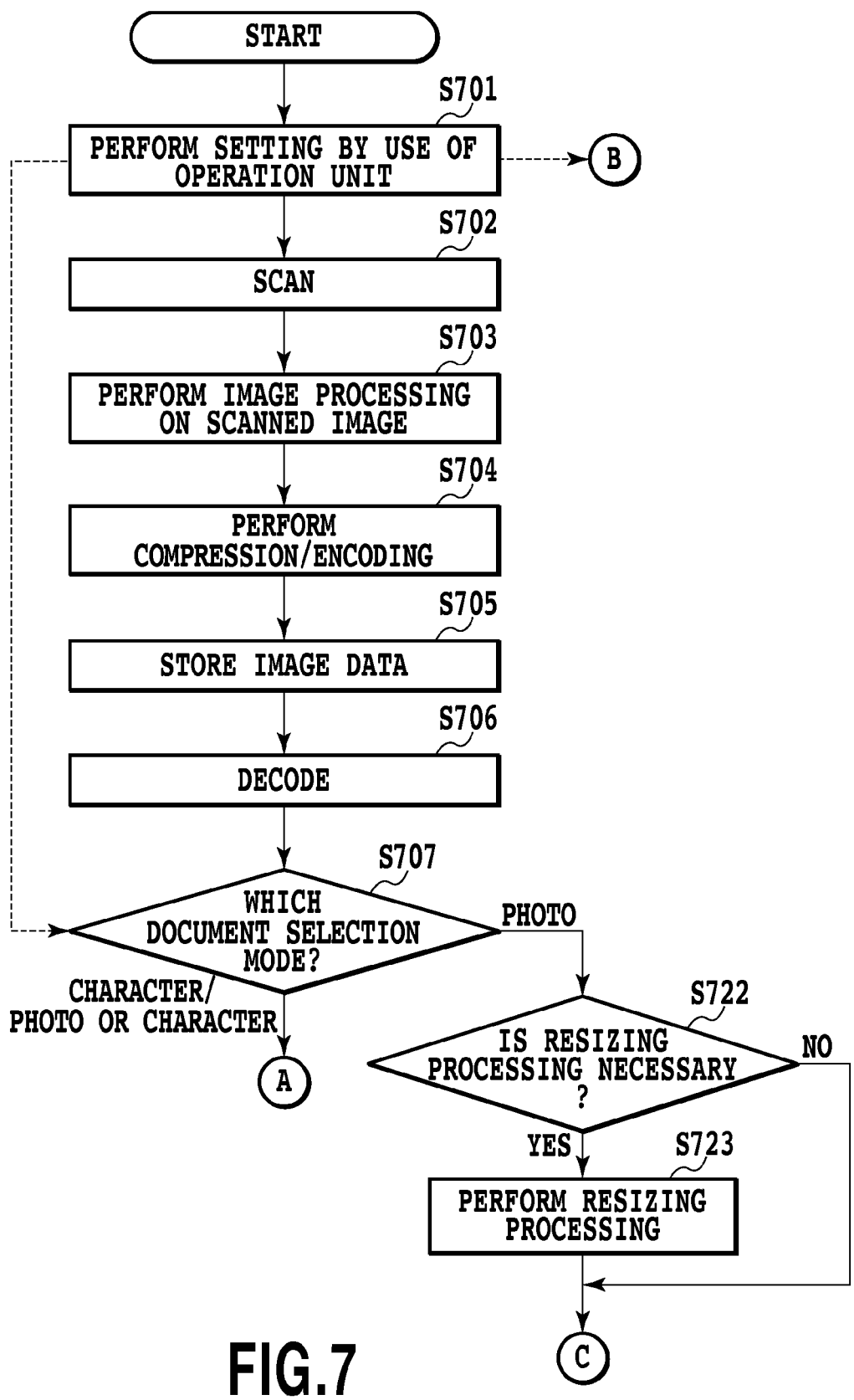
FIG. 7 is a flowchart illustrating processing according to a third embodiment of the present invention.
Figure 8:
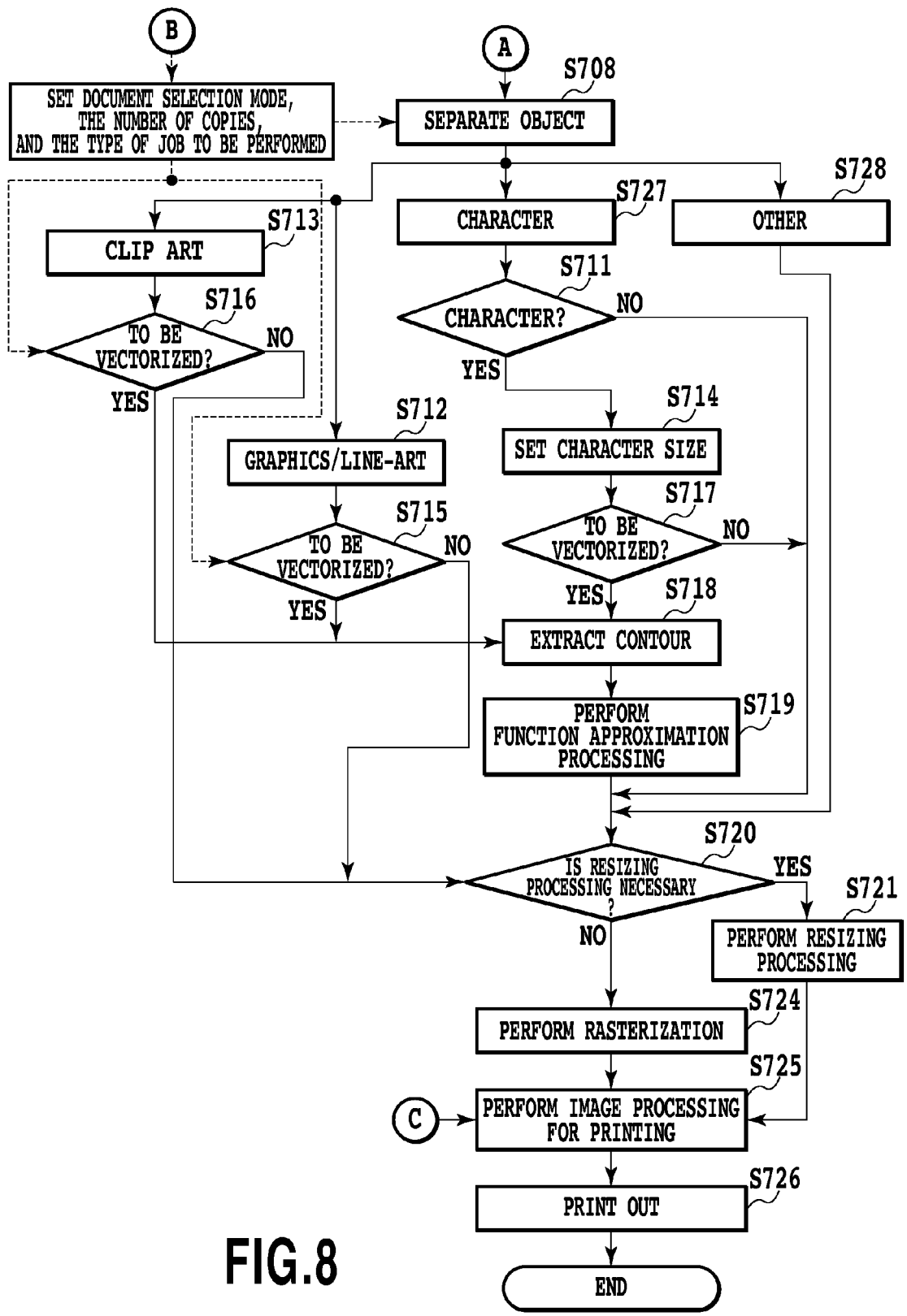
FIG. 8 is a flowchart illustrating processing according to the third embodiment of the present invention.

FIGS. 7 and 8 are flowcharts illustrating the flow of processing performed by the image processing device 100. The flow of processing performed by the image processing device 100 will be described below with reference to the configuration shown in FIG. 2.

In S701, the operation unit 104 sets the type of job to be done, the document selection mode, the number of copies, and the like in response to an instruction given by a user. The types of jobs include copying, sending, storing, and the like. The document selection mode mentioned above is the mode in which the user selects the type of original documents to be read. For example, the document mode includes a character mode, a photo mode, a character/photo mode, and the like.

In S702, when the user presses on a start button on the operation unit 104, the scanner unit 101 scans an original document, and outputs the scanned image data to the scanner-image processing unit 202.

In S703, the scanner image processing unit 202 performs image processing, such as color correction processing, on the image data received from the scanner unit 101, and outputs the resultant data to the image compression/encoding unit 203.

In S704, the image compression/encoding unit 203 performs compression/encoding for the image data received from the scanner image processing unit 202, and outputs the resultant data to the image-data storage unit 204. The processing of compression/encoding is performed by a well-known compression and decompression technique, such as JPEG.

In S705, the image-data storage unit 204 stores the compressed image data received from the image compression/encoding unit 203. For example, the image-data storage unit 204 may be a storage device provided outside of the image processing device 100, or a hard-disk drive built in the image processing device 100.

In S706, the image decompression/decoding unit 205 reads out the compressed image data from the image-data storage unit 204, and decodes the data thus read. The decoding of the compressed image data is performed by a well-known compression and decompression technique, such as JPEG.

In S707, the controller 102 switches the processing performed on the decoded image data from one to another in accordance with the document selection mode having been set in S701. Specifically, when the document selection mode is set at the photo mode, the process proceeds to S722. When the document selection mode is set either at the character/photo mode or at the character mode, the process proceeds to S708.

When the document selection mode is set at the photo mode, the image processing device 100 performs the following processing.

In S722, when the type of job to be done is copying, the controller 102 determines whether to perform resizing processing, according to the number of copies set in S701. When the controller 102 determines that resizing processing is performed, the controller 102 performs the resizing processing in S723, and the resized image data is outputted to the image processing unit 206. The resizing can be performed by a well-known technique. For example, the controller 102 determines to perform resizing when the number of copies is set at 2.

In S725, the image processing unit 206 performs image processing for printing on the received image data, and outputs the resultant data to the printer unit 103. The image processing for printing mentioned here includes, for example, a well-known color correction processing and the like.

In S726, the printer unit 103 receives and prints out the image data that has been subjected to the image processing for printing.

When the document selection mode is set either at the character/photo mode or at the character mode, the image processing device 100 performs the following processing.

In S708, the object separating unit 208 separates objects such as a character object, a drawing object, a line object, a table object, and the like from the image data received from the image decompression/decoding unit 205. When the separation of objects is performed, the object separating unit 208 modifies a criterion for determining the type of the object in accordance with the document selection mode and the number of copies, which have been set with the operation unit 104. For example, when the document selection mode is set at the character mode and the number of copies is set at 20, the object separating unit 208 establishes a criterion which makes an object more likely to be determined as the character object. On the other hand, when the document selection mode is set at the photo mode and the number of copies is set at 20, the object separating unit 208 establishes a higher determination criterion for determining an object as the character object. In this way, nothing but characters can be determined as the character objects with more certainty. Also in the determination of the clip-art objects or the graphic/line-art objects, the determination criterion is modified in accordance with the setting of the document selection mode and the number of copies. The reason why the determination criterion is established, the vector transform for the clip-art object or the graphic/line-art object requires more processing time than the vector transform for the character object. Also, the more the number of copies is the larger of the difference in the processing time. Accordingly, when the number of copies is large, the setting is performed in such a way that image data is easily determined as the character object.

FIG. 12 is a chart illustrating a relationship between the number of copies and the determination criterion for character objects. Note that the relationship shown in FIG. 12 is nothing but an example. The relationship between the number of copies and the determination criterion for character objects can be set arbitrarily.

FIG. 12 shows that a higher determination criterion for the character objects is applied to a case where the number of copies is set at 1. Accordingly, in this case, the object is less likely to be determined as the character object than otherwise. In contrast, a lower determination criterion for the character objects is applied to a case where the number of copies is set at 20. Accordingly, in this case, the object is more likely to be determined as the character object than otherwise. In this way, the received image data is separated into the character object, the graphic/line-art object and a clip-art object. When an object is determined as the character object, the process proceeds to S727. When an object is determined as the graphic/line-art object, the process proceeds to S712. When an object is determined as the clip-art object, the process proceeds to S713. Also, when it is determined that an object does not correspond to any one of these objects, the process proceeds to S728 and the object is processed as otherwise object.

When an object is determined as the character object in S708, the process proceeds to S727. Subsequently, in S711, the object separating unit 208 further performs a determination whether or not the object that has been determined as the character object actually corresponds to a character. When the object actually corresponds to a character, the process proceeds to S714. In contrast, when the object does not correspond to a character, the process proceeds to S720.

In S714, the controller 102 set the size of the character that is transformed into vector data.

In S717, the controller 102 determines, by referring to the table shown in FIG. 7, whether to transform the image data of the character into vector data. When the controller 102 determines that the image data of the character is transformed into vector data, the process proceeds to S718. In contrast, when the controller 102 determines that the image data of the character is not transformed into vector data, the process proceeds to S720.

In S718, the contour-extraction/function-approximation unit 209 extracts the contour data of the character.

In S719, the contour-extraction/function-approximation unit 209 performs function approximation for the contour data of the extracted character with a straight line or a curve. The processing of function approximation can be performed by a well-known technique.

In S720, the controller 102 determines whether or not the contour data of the character for which function approximation has been performed is necessary to be resized. When the controller 102 determines that the contour data is necessary to be resized, the process proceeds to S721. In contrast, when the controller 102 determines that the contour data does not have to be resized, the process proceeds to S724.

In S721, the controller 102 resizes the contour data of the character for which function approximation has been performed.

In S724, the controller 102 transforms the contour data of the character for which function approximation has been performed into bitmap data (that is, the contour data is rasterized).

The rasterized contour data of the character is subjected to predetermined processing in each of the metadata creation unit 211, the metadata synthesizing unit 212, the data synthesizing unit 213, and the format converting unit 214. After that, the resultant data is outputted, as image data, to a printer-image processing unit 325.

In S725, the printer-image processing unit 325 performs image processing for printing on the received image data.

In S726, the printer unit 103 receives the image data on which the image processing for printing has been performed, and prints out the received data.

In S712, the controller 102 determines what type of image the object that has been determined as a graphics/line-art is. In the third embodiment, the controller 102 determines whether the object has the chromatic color or the achromatic color. After that, the process proceeds to S715.

In S715, the controller 102 determines whether to transform the image data of the graphics/line-art into vector data. The determination is made based both on the determination result in S712 (whether the object has the chromatic color or the achromatic color) and on the type of job set with the operation unit 104. For example, when the type of job is copying and the object has the chromatic color, the controller 102 determines that the image data is not transformed into vector data. Alternatively, when type of jobs is copying and the object has the achromatic color, the controller 102 determines that the image data is transformed into vector data. Still alternatively, when the type of job is sending, the controller 102 determines that the image data is transformed into vector data irrespective of whether the object has the chromatic color or the achromatic color.

In S713, the controller 102 determines what type of image the object that has been determined as a clip art is. In the third embodiment, the controller 102 determines the number of colors that the object has. After that, the process proceeds to S716.

In S716, the controller 102 determines whether to transform the image data of the clip art into vector data. The determination is made based both on the determination result in S713 (the number of colors) and on the type of job set with the operation unit 104. For example, when the type of job is copying and the number of colors is 64, the controller 102 determines that the image data is not transformed into vector data. Alternatively, when the type of job is sending and the number of colors is 64, the controller 102 determines that the image data is transformed into vector data.

Then, the controller 102 performs the processing described at each of S718 to 726 on the object that has been determined that the image data thereof is transformed into vector data either in S715 or S716. In contrast, the controller 102 performs the processing described at each of S720 to 726 on the object that has been determined that the image data thereof is not transformed into vector data.

In addition, the controller 102 performs the processing described at each of S720 to S726 on the object that has been determined that the image data thereof is not transformed into vector data in S717.

According to the third embodiment, it becomes possible to determine whether or not the vector transform is performed, after considering the processing time required for the vector transform, following separating the image data into objects. This will enable to improve performance of the device.

Other Embodiment

The embodiments of the present invention can take the forms of a system, a device, a method, a computer program, and a computer-readable recording medium. In addition, the present invention is applicable either to a system including a plurality of devices or to a single device.

One of the embodiments of the present invention is: firstly, providing a computer program to implement the above-described function of the present invention to a system or a device by means of a recording medium or a network; and then making a computer included either in the system or in the device execute the program. Note that the recording medium mentioned above is a computer-readable recording medium. Accordingly, one of the embodiments of the present invention is the very computer program that implements the function of the present invention. The computer program includes an object code, a program executed by an interpreter, script data provided to the OS. Some examples of the recording medium are: a floppy disk, a hard disk, an optical disk, a magneto optical disk, an MO, a CD-ROM, a CD-R, a CD-RW, a magnetic tape, a non-volatile memory card, a ROM, and a DVD. An example of the method of providing the program is downloading the program via the Internet into a recording medium, such as a hard disk, by use of a browser installed in a client computer. According to this method, a file of the computer program or a compressed file with an automatic installation function is downloaded via the Internet. In addition, one of the embodiments of the present invention is: dividing the program code that forms the computer program into a plurality of files; and then downloading the files respectively from different servers. Moreover, one of the embodiments of the present invention is a server that allows a plurality of users to download the file of the computer program.

The above-described function of the embodiments can be implemented by making a computer execute the computer program. In addition, the above-described function of the embodiments can also be implemented by making the OS and the like that are running on the computer perform a part of or the entire part of the actual processing according to the instruction given to the computer program.

In addition, the above-described function of the embodiments can also be implemented after the computer program that has been read from the recording medium is written in a memory provided either to a function-extender board inserted in the computer or to a function-extender unit connected to the computer. To put it differently, the above-described function of the embodiments can also be implemented by making the CPU and the like provided either in the function-extender board or in the function-extender unit perform a part of or the entire part of the actual processing according to the instruction of the computer program.

While the present invention has been discussed with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A device comprising:
   at least a processor and a memory, functioning as:
   a separating component which separates an object from image data;
   a determining component which determines an attribute of the object;
   a judging component which judges whether to perform vector transform for the object on the basis of the attribute of the object; and
   a vector transform component which performs vector transform for the object, wherein
   if said determining component determines that the attribute is character, said judging component judges that the object is transformed into vector data if the object has a predetermined size, and
   if said determining component determines that the attribute is graphics or line-art, said judging component judges that the object is transformed into vector data if a type of job to be performed on the object is transmission.

2. The device of claim 1, wherein a determination criterion for determining the attribute of the object is modified in accordance with a document selection mode which indicates a type of the image data, a combination of the document selection mode and a magnification set for the object, or a combination of the document selection mode and the number of copies set for a document.

3. The device of claim 2, wherein the document selection mode is a character mode, a photo mode, or a character-or-photo mode.

4. A method comprising the steps of:
   separating an object from image data;
   determining an attribute of the object;
   judging whether to perform vector transform for the object on the basis of the attribute of the object; and
   performing vector transform for the object, wherein
   if it is determined that the attribute is character, the judging step includes judging that the object is transformed into vector data if the object has a predetermined size,
   if it is determined that the attribute is graphics or line-art, the judging step includes judging that the object is transformed into vector data if a type of job to be performed on the object is transmission, and
   at least some of said steps are performed using a computer.

5. The method of claim 4, wherein a determination criterion for determining the attribute of the object is modified in accordance with a document selection mode which indicates a type of the image data, a combination of the document selection mode and a magnification set for the object, or a combination of the document selection mode and the number of copies set for a document.

6. The method of claim 5 wherein the document selection mode is a character mode, a photo mode, or a character-or-photo mode.

7. A non-transitory computer-readable recording medium having computer-executable instructions for causing a computer to perform a method, the method comprising the steps of:

separating an object from image data;
determining an attribute of the object;
judging whether to perform vector transform for the object on the basis of the attribute of the object; and
performing vector transform for the object, wherein
if it is determined that the attribute is character, the judging step includes judging that the object is transformed into vector data if the object has a predetermined size, and
if it is determined that the attribute is graphics or line-art, the judging step includes judging that the object is transformed into vector data if a type of job to be performed on the object is transmission.

* * * * *